United States Patent
Osborn et al.

(10) Patent No.: US 9,213,381 B2
(45) Date of Patent: Dec. 15, 2015

(54) VOLTAGE REGULATOR DYNAMICALLY DETERMINING WHETHER REQUESTED POWER TRANSITION CAN BE SUPPORTED

(75) Inventors: Michael J. Osborn, Hollis, NH (US); Sebastien Nussbaum, Lexington, MA (US); John P. Petry, San Diego, CA (US); Umair B. Cheema, Richmond Hill (CA)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 465 days.

(21) Appl. No.: 13/479,597

(22) Filed: May 24, 2012

(65) Prior Publication Data

US 2013/0318372 A1 Nov. 28, 2013

(51) Int. Cl.
*G06F 1/32* (2006.01)
*G06F 1/26* (2006.01)

(52) U.S. Cl.
CPC ............... *G06F 1/26* (2013.01); *G06F 1/3203* (2013.01)

(58) Field of Classification Search
CPC ................................ G06F 1/3203; G06F 1/26
USPC ................... 713/320, 300; 323/283
See application file for complete search history.

(56) References Cited

U.S. PATENT DOCUMENTS

| | | | | |
|---|---|---|---|---|
| 6,472,899 B2 * | 10/2002 | Osburn et al. | | 702/64 |
| 6,854,067 B1 * | 2/2005 | Kutz et al. | | 713/340 |
| 7,174,467 B1 * | 2/2007 | Helms et al. | | 713/300 |
| 7,421,604 B1 * | 9/2008 | Mimberg | | 713/340 |
| 7,441,137 B1 * | 10/2008 | Mimberg | | 713/340 |
| 7,539,880 B2 * | 5/2009 | Mentzer et al. | | 713/300 |
| 7,890,781 B2 * | 2/2011 | Gunther et al. | | 713/300 |
| 8,072,247 B1 * | 12/2011 | Wright | | 327/143 |
| 8,245,057 B2 * | 8/2012 | Lyu | | 713/300 |
| 8,245,070 B2 * | 8/2012 | Finkelstein et al. | | 713/375 |
| 8,278,978 B1 * | 10/2012 | Wright | | 327/143 |
| 8,417,980 B1 * | 4/2013 | Mimberg | | 713/330 |
| 8,452,993 B2 * | 5/2013 | Bridges | | 713/300 |
| 8,601,292 B2 * | 12/2013 | Lam et al. | | 713/310 |
| 2002/0079874 A1 * | 6/2002 | Horigan et al. | | 323/283 |
| 2002/0112193 A1 * | 8/2002 | Altman et al. | | 713/323 |
| 2002/0188877 A1 * | 12/2002 | Buch | | 713/320 |
| 2004/0107370 A1 * | 6/2004 | Mosley | | 713/300 |
| 2004/0123170 A1 * | 6/2004 | Tschanz et al. | | 713/320 |
| 2005/0206392 A1 * | 9/2005 | Kantorovich et al. | | 324/522 |
| 2006/0022640 A1 * | 2/2006 | Frith et al. | | 320/125 |
| 2007/0016814 A1 * | 1/2007 | Rusu et al. | | 713/320 |

(Continued)

OTHER PUBLICATIONS

Michael Tyler, "An Introduction to your Computer", Bleepingcomputer.com, Oct. 19, 2011.*

*Primary Examiner* — Thomas Lee
*Assistant Examiner* — Santosh R Poudel
(74) *Attorney, Agent, or Firm* — Faegre Baker Daniels LLP

(57) ABSTRACT

A method of controlling voltage in a circuit is provided. Within the circuit, a block of an electrical component provides an indication that it desires to switch states (such as from off to on, on to off, or from one speed to another). The change in states requires a different current draw by the electrical component block. The indication is received by an electrical component that controls the voltage of the circuit. The electrical component that controls the voltage then issues a signal granting permission for the electrical component block to switch states. This permission signal is received by the electrical component and the electrical component block changes state.

22 Claims, 7 Drawing Sheets

(56) References Cited

U.S. PATENT DOCUMENTS

| | | | |
|---|---|---|---|
| 2007/0257646 A1* | 11/2007 | Leutgeb et al. | 323/277 |
| 2008/0106248 A1* | 5/2008 | Qahouq et al. | 323/318 |
| 2008/0244294 A1* | 10/2008 | Allarey | 713/324 |
| 2009/0077402 A1* | 3/2009 | Huang et al. | 713/320 |
| 2009/0089600 A1* | 4/2009 | Nousiainen | 713/323 |
| 2009/0089607 A1* | 4/2009 | Rodriguez et al. | 713/340 |
| 2009/0167092 A1* | 7/2009 | Ma et al. | 307/75 |
| 2009/0172423 A1* | 7/2009 | Song et al. | 713/300 |
| 2009/0249092 A1* | 10/2009 | Lam et al. | 713/310 |
| 2009/0307509 A1* | 12/2009 | Jenne | 713/322 |
| 2010/0169609 A1* | 7/2010 | Finkelstein et al. | 712/43 |
| 2011/0087900 A1* | 4/2011 | Lakhanpal et al. | 713/300 |
| 2011/0138388 A1* | 6/2011 | Wells et al. | 718/100 |
| 2011/0154066 A1* | 6/2011 | Ravichandran et al. | 713/300 |
| 2011/0208371 A1* | 8/2011 | Duncan et al. | 700/297 |
| 2012/0054515 A1* | 3/2012 | Naffziger et al. | 713/320 |
| 2012/0072746 A1* | 3/2012 | Sotomayor | 713/320 |
| 2012/0079290 A1* | 3/2012 | Kumar et al. | 713/300 |
| 2012/0144217 A1* | 6/2012 | Sistla et al. | 713/320 |
| 2012/0159198 A1* | 6/2012 | Naffziger et al. | 713/300 |
| 2012/0159219 A1* | 6/2012 | Huang et al. | 713/323 |
| 2012/0260258 A1* | 10/2012 | Regini et al. | 718/104 |
| 2013/0297950 A1* | 11/2013 | Osborn et al. | 713/300 |
| 2013/0339777 A1* | 12/2013 | Varma et al. | 713/340 |
| 2014/0245034 A1* | 8/2014 | Rotem et al. | 713/300 |

* cited by examiner

US 9,213,381 B2

VOLTAGE REGULATOR DYNAMICALLY DETERMINING WHETHER REQUESTED POWER TRANSITION CAN BE SUPPORTED

FIELD OF THE DISCLOSURE

The present disclosure is related to automated methods and devices for dynamically setting a load line voltage.

BACKGROUND

In electronics, "load regulation" is concerned with the capability to maintain a constant voltage (or current) level on the output channel of a power supply despite changes in load. A voltage regulator is a switching power supply that supplies a steady voltage to a load. A voltage regulator that supplies voltage to a Central Processing Unit (CPU) is a CPU voltage regulator. CPU voltage regulators receive one voltage and supply a second voltage to a processor (in this case the processor is a CPU which is sometimes also known as a microprocessor).

When the load current suddenly increases, such as when the processor state changes from idle to active, the voltage supplied to the processor is drawn down, known as a voltage transient or voltage droop 16 (see FIG. 1). Likewise, a voltage spike may occur when the processor state changes from active to idle. Changes in state may also result in voltage overshoot 18. Overshoots 18 describe the fact that a transient voltage value does not stop precisely at its destination voltage, but rather shoots past (i.e. over) the destination voltage and then reverses back. Additional overshoots are often experienced, with each successive overshoot having a smaller magnitude than the previous. The voltages supplied at active and idle processor states are further provided at levels that ensure that such droops, spikes, and overshoots will not take the voltage level outside of necessary limits.

Accordingly, during times of low current, more voltage is supplied than is necessary for the experienced load. In designing the circuit and setting the voltage to be supplied, designers must determine a "worst case" voltage transient that could result from one or more inactive (idle) blocks becoming active. The voltage supplied must be high enough to handle the worst case transient. The difference between this supplied voltage and the voltage necessary to power the currently active blocks (the load) is a protection voltage. This protection voltage results in increased power consumption in the low current state relative to what is necessary for the experienced load. Increased power consumption results in increased power costs and produces increased heat. Additionally the extra heat produced contributes to an overall heat produced by the circuit. When the heat produced by a circuit is at or above the amount of heat that the circuit can dispose of, the operations of the circuit must be altered, for example, by reducing clock speed, making blocks inactive, or otherwise reducing the amount of heat being produced. Accordingly, the artificially inflated load voltage leads to reduced processing speed of the circuit. Additionally, artificially inflated load voltage leads to increased current and power use. Such increased current and power use can reduce battery life for devices operating off of a battery.

Accordingly, there exists a need for an improved method and apparatus that provides regulation while reducing any excess heat and performance drain beyond that necessary to power the attached load. Furthermore, there exists a need to supply the needed power without placing the circuit at risk for damage from voltage droop and overshoot.

DETAILED DESCRIPTION

Figure 1:
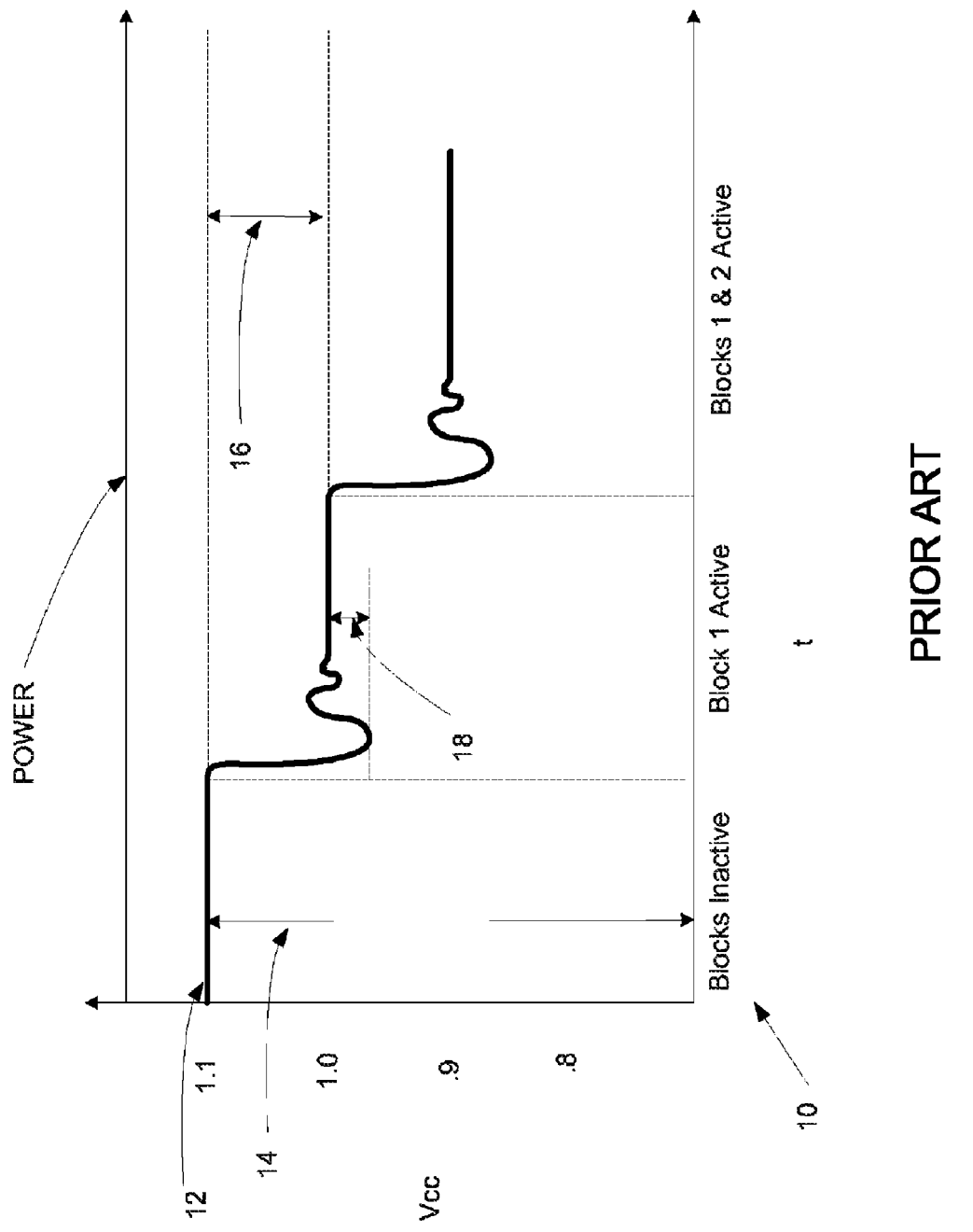
FIG. 1 is a graph showing prior art implementation of load line voltage.

In an exemplary and non-limited embodiment, aspects of the invention are embodied in a method of controlling voltage in a circuit. Within the circuit, a block of an electrical component provides an indication that it desires to switch states (such as from off to on, on to off, or from one speed to another). The change in states requires a different current draw by the electrical component block. The indication is received by an electrical component that controls the voltage of the circuit. The electrical component that controls the voltage then issues a signal granting permission for the electrical component block to switch states. This permission signal is received by the electrical component and the electrical component block changes state.

Briefly, in one example, a circuit includes an electrical component operative to handle at least one processing block; a voltage control module controlling a voltage supplied to the at least one electrical component; each of the at least one processing block having a first state presenting a first load on the supplied voltage and having a second state presenting a second load on the supplied voltage; and a voltage control module. The voltage control module is operative to determine that the at least one processing block wants to switch from the second state to the first state; determine a voltage increase requirement that could be caused by the at least one processing block switching from the second state to the first state; and alter the voltage supplied by the voltage control module responsive to a voltage increase requirement to satisfy a desired switch from the second state to the first state.

In another example, a method of controlling circuit voltage is provided. The method including determining that at least one electrical component block wants to switch from a second state that draws a second current flow to a first state that draws a first current flow; determining a voltage change requirement to provide for the at least one electrical component block switching from the second state to the first state; and altering the voltage supplied by the voltage control module to accommodate the determined voltage change requirement.

In yet another example, a method of controlling circuit voltage is provided. The method including providing, by an electrical component, an indication that an electrical component block desires to enter a state that requires a different current draw relative to a current state of the electrical component block; receiving permission via a processor to enter the state that requires a different current draw; and entering, by the electrical component block, the state that requires a different current draw.

In still another example, a voltage controller is provided. The voltage controller including logic to regulate a direct current (DC) output voltage in accordance with a loadline to power at least one electrical component block, each electrical component block of the at least one electrical component block having a first state that draws a first current flow and having a second state that draws a second current flow, the second current flow being less than the first current flow; the loadline being dynamically set to supply a voltage that is the sum of 1) voltage necessary to supply the coupled at least one component block in its current state and 2) an amount equal to a worst case voltage step associated with switching from the second state to the first state.

In certain embodiments, the method and device may provide for reduced power consumption and/or increased performance. The reduced power and increased performance may be achieved without subjecting the processor to increased instability or dangers of faults.

FIG. 1 is a graph showing how the prior art handles load line voltages. When processing blocks are inactive (portion 10), a load line voltage 12 is maintained that is suitable for the worst case of load demand 14. Thus, if all processing blocks were simultaneously activated to draw maximum power and provided power spikes (the worst case scenario), the load line voltage 12 would be sufficient to power such an event while maintaining the stability of the processing system. The voltage source providing the load line voltage 12 is not provided with any information regarding when to expect activation of the processing blocks. Thus, the voltage source must provide the voltage 12 suitable to handle the worst case scenario. Processors often spend significant time with processing blocks in inactive states. Thus, wasted voltage is unnecessarily provided for a significant amount of time to assure that stability is maintained in the worst case scenario.

Figure 4:
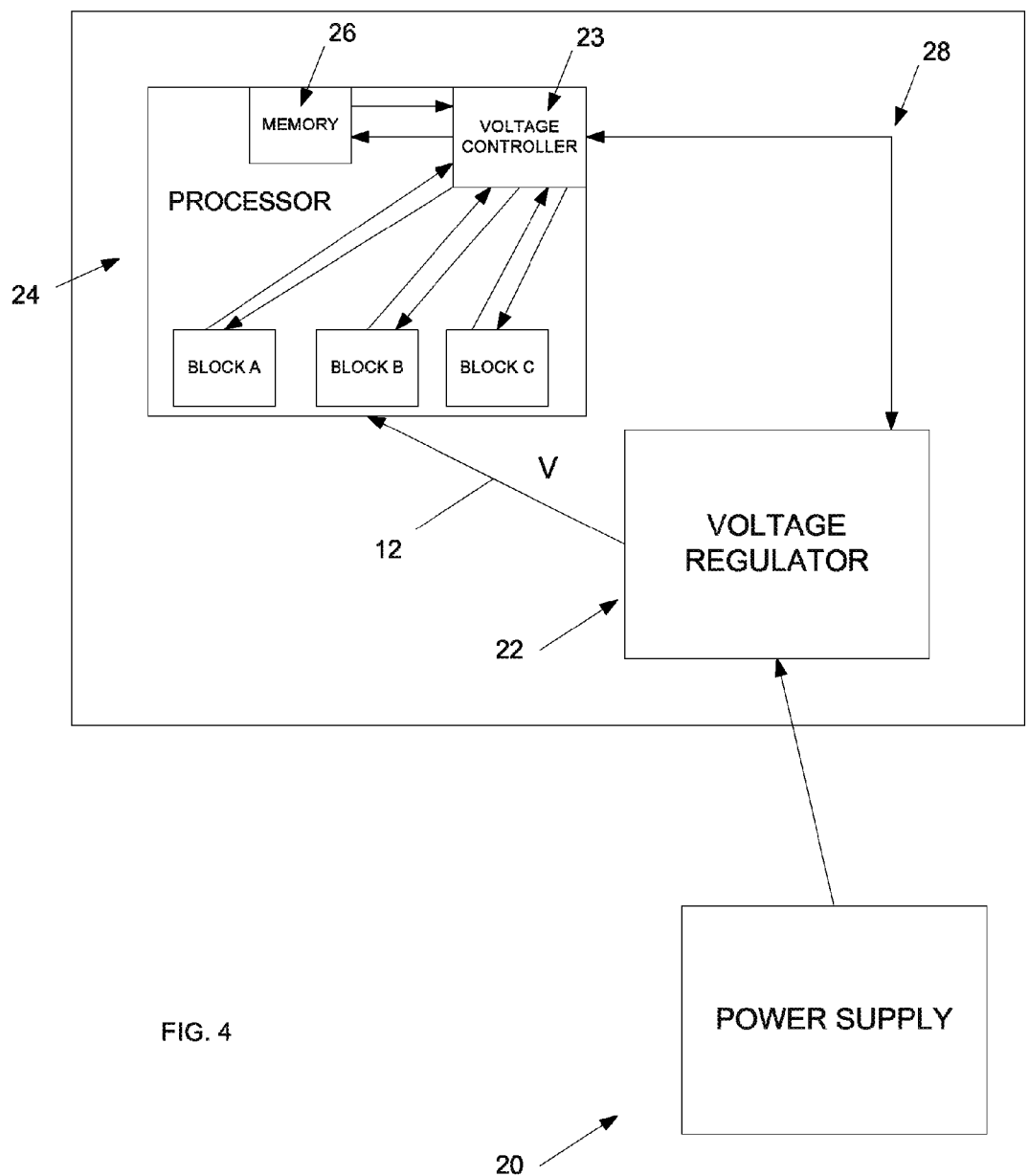
FIG. 4 is a diagrammatic view of an embodiment of a computing system for employing the load line voltage of FIG. 2 and FIG. 3.

Turning now to the drawings wherein like numerals represent like components, FIG. 4 shows a computing system utilizing a power supply 20 that powers voltage regulator 22. Voltage regulator 22, in turn, provides load line voltage 12 to processor 24. Memory 26 is also provided and may be integral or separate from voltage regulator 22. In addition to the circuits providing load line 12, communication circuits 28 are provided for communication between voltage regulator 22 and processor 24. The computing system of FIG. 4 may be embodied in any kind of computing device including, but not limited to, conventional desktop and laptop computing systems, handheld or mobile computing systems (e.g., mobile phones such as, for example, smart phones, tablets), servers, digital televisions and other systems that provide various types of data processing including, but not limited, video or graphics processing.

Processor 24 is able to allocate some or all of its processing power to various processing blocks, or tasks. The processing power of processor 24 can be dedicated to a single block, or split over multiple blocks. Still further, certain blocks may not be able to take advantage of the full processing capacity of processor 24 such that processor 24 can fully handle more than one block when each block is operating at its peak. Processor 24 receives requests for processing allocations for blocks and then allocates processing capacity to the allocation requests. Voltage controller 23 is a portion of processor 24 that determines and calls for voltage from voltage regulator 22. Memory 26 is in communication with voltage controller 23. Memory 26 stores information indicating which blocks are requesting a processing allocation. Memory 26 further stores information regarding which blocks are currently receiving a processing allocation. Additionally, memory 26 stores parameters of processing requirements that various blocks require. These parameters include voltage requirements, current requirements, power requirements, time requirements Power supply 20 provides power to voltage regulator 22. Voltage regulator 22 provides a desired DC voltage to processor 24.

Figure 5:
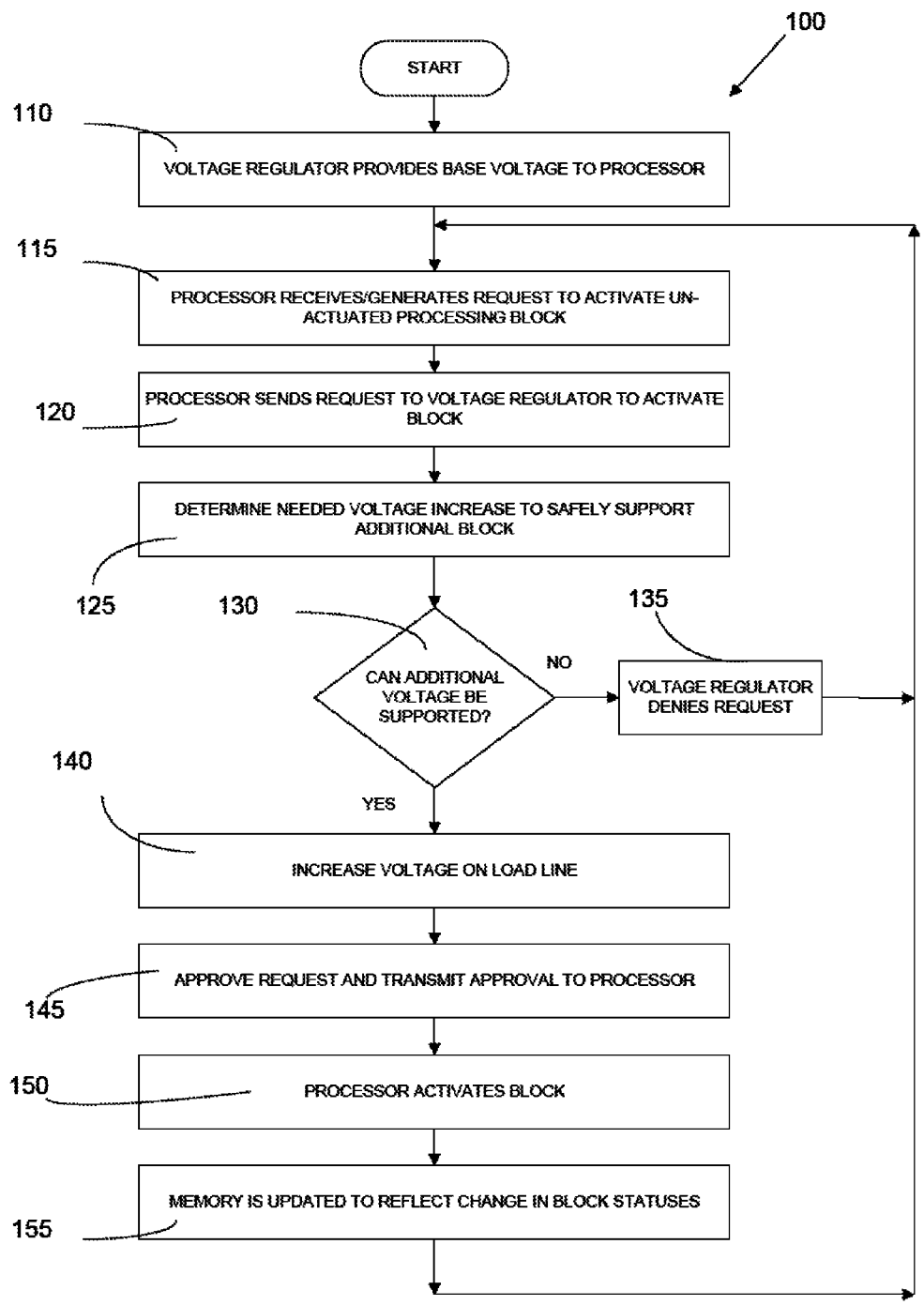
FIG. 5 is a flow chart showing an embodiment of the method employed by the system of FIG. 4 to achieve the load line voltage of FIG. 2 and FIG. 3.
Figure 6:
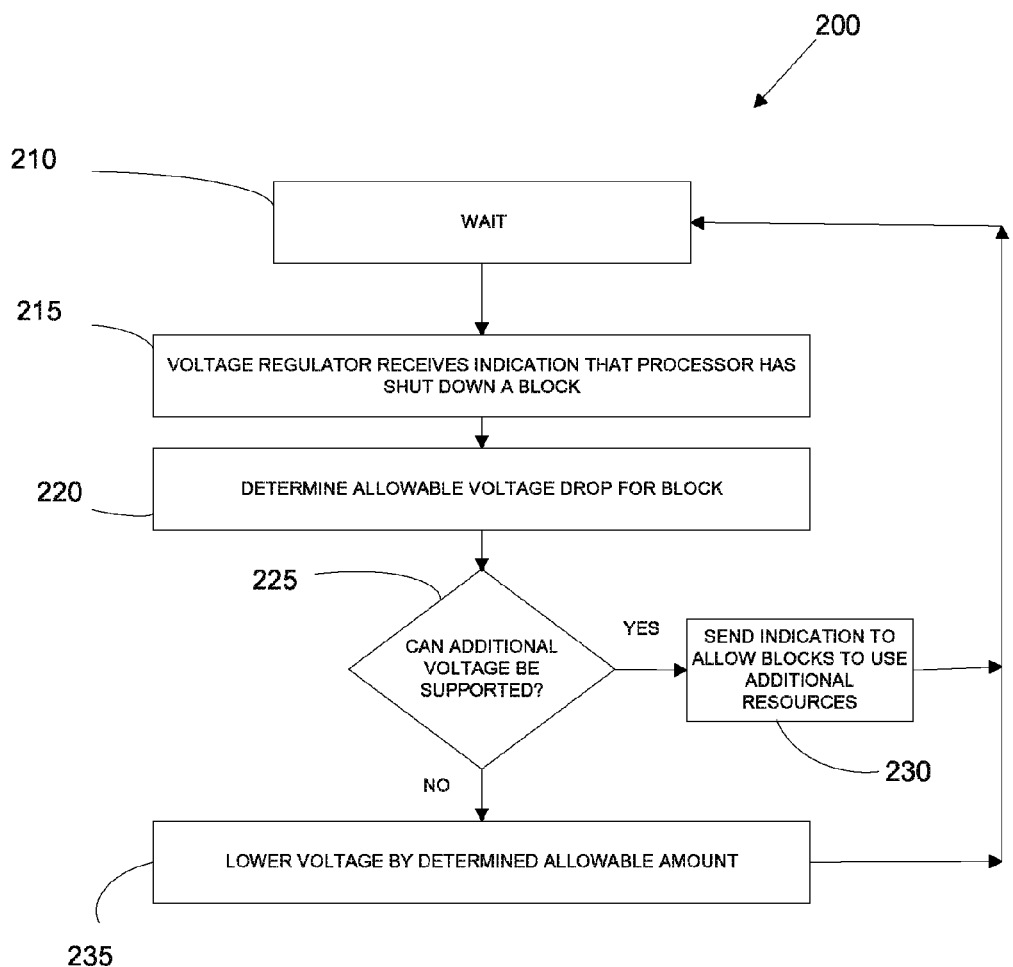
FIG. 6 is a flow chart showing an embodiment of the method employed by the system of FIG. 4 to achieve load line voltages when processing blocks are being transitioned from active to inactive states.

Having discussed the physical portions, FIGS. 5 and 6 show pieces of process 100 performed by processor 24 and voltage regulator 22. It should be appreciated that while various determinations and decisions are discussed below as being made by each of processor 24 and voltage controller 23, the software, firmware, hardware, and any other piece involved in the process can be set up to perform the determinations and direct the operation of other pieces. Similarly, in one embodiment, a dedicated microcontroller is provided for providing direction.

At any point in operation, processor 24 may want to maintain its current processing state, activate an additional processing block (FIG. 5), or deactivate an active processing block (FIG. 6). On startup, voltage regulator 22 provides a baseline amount of voltage to processor 24. (110) Processor 24 then receives an indication that activation of an additional block is desired to satisfy a program request or otherwise. (115) Processor 24, via voltage controller 23, then sends a request, via bi-directional communication circuitry 28, to voltage regulator 22 requesting that the voltage be adjusted to provide for activation of the additional block. (120)

Voltage controller 23 determines the altered (in this case, added) voltage needed to support the requested additional block. (125) In one embodiment, such determination involves a dynamic calculation of what voltage is needed or expected. This dynamic calculation produces a "worst case scenario" voltage droop and overshoot that could be associated with the activation of the requested block. In another embodiment, the "worst case scenario" voltage droop for all blocks is predetermined and stored in a lookup table accessible to voltage controller 23. It should be appreciated that this is one specific place where the determination can actually be made elsewhere. For example, embodiments are envisioned where voltage regulator 22 knows what blocks are running and knows what voltage is being required to support the running blocks. In one embodiment, processor 24 contains voltage controller 23 that dynamically calculates the "worst case scenario" droop and overshoot and in another embodiment a lookup table is accessed by processor 24 for such information.

Voltage controller 23 (or voltage regulator 22) then determines whether the activation of the additional block can be supported. (130) If not, the request is denied and the system returns to wait for additional requests. (135) It should be appreciated that the most common situation will be that activation of additional blocks can be supported.

Before the block is granted permission to become active, voltage controller 23 requests that the voltage regulator 22 increases the load line voltage by an amount, such as the "worst case scenario" voltage droop and overshoot amount associated with the additional block. (140) Voltage regulator 22 may send a transmission to processor 24 that informs voltage controller 23 that the voltage has been updated and activation of the requested block may occur. (145) Alternately, voltage controller 23 may wait a fixed amount of time to ensure that the voltage has been updated. In embodiments where voltage regulator is performing the determinations, this transmission serves as a granting of permission to activate the requested block.

Voltage controller 23 then activates the block and the associated additional load is applied. (150) Memory 26 is then updated to indicate that the requested block is active. (155)

FIG. 6 shows process 200 that is followed when deactivation of blocks is desired. While waiting (210), voltage controller 23 receives an indication that processor 24 has shut down a block. (215) A determination is then made as to how much of a voltage and power drop can be allowed due to the deactivation of the block. (220) It should be appreciated that embodiments are envisioned where this determination is made by voltage regulator 22 and embodiments are envisioned where this determination is made by processor 24 or voltage controller 23. A determination is then made as to whether the processing power being allocated to the deactivated block could be used by other active blocks. (225) If so, then the voltage can be maintained and other blocks are permitted to take on some of the now-available power. (230) If other active blocks are not able or do not desire to take on additional power, voltage regulator 22 lowers the power and voltage being output. (235) Lowering of the power and voltage is done by voltage controller 23 requesting that voltage regulator 22 alter (in this case, lower) the voltage by an amount that covers the load step associated with the deactivated block.

Figure 2:
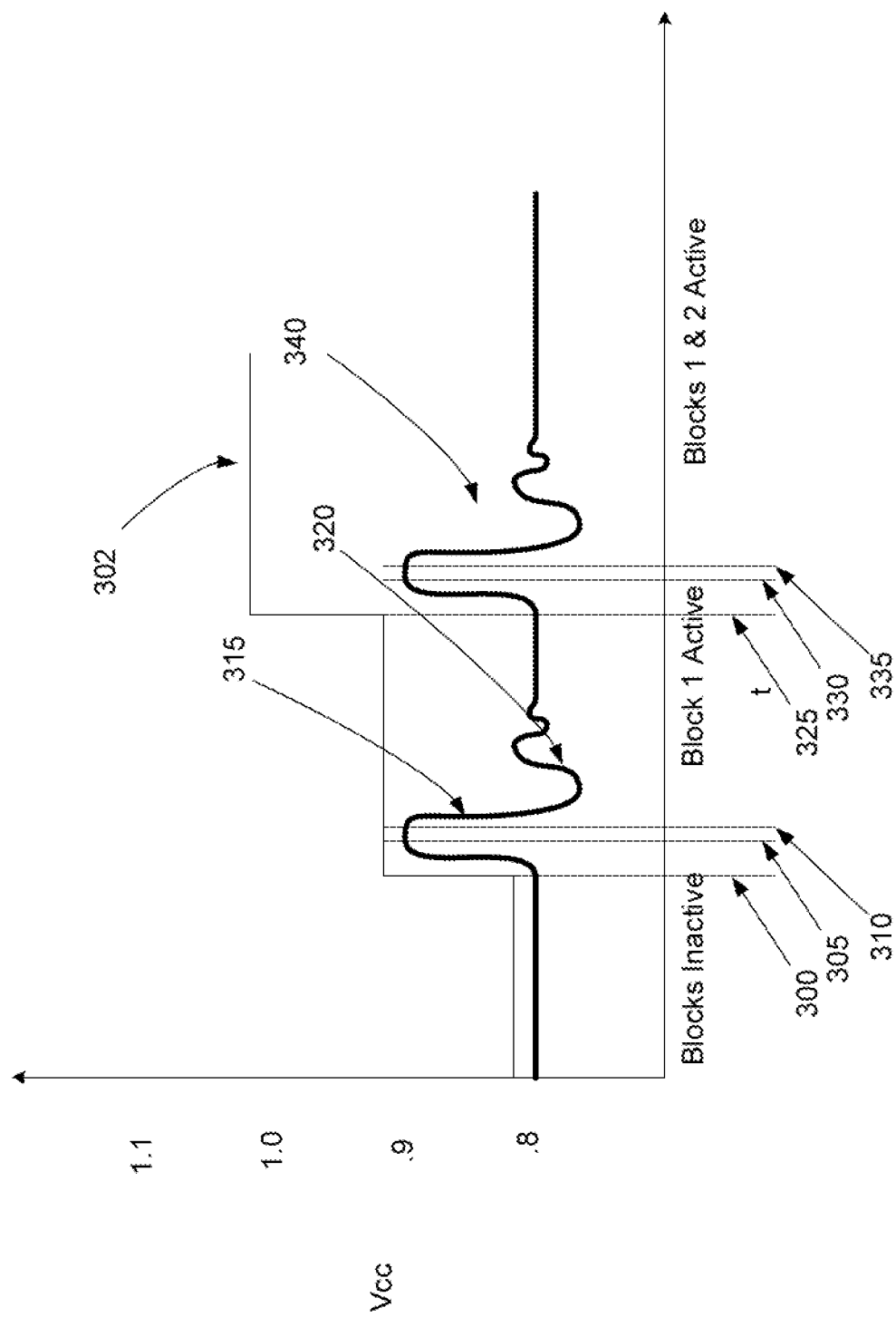
FIG. 2 is a graph showing implementation of load line voltage in accordance with an embodiment of the present disclosure.
Figure 3:
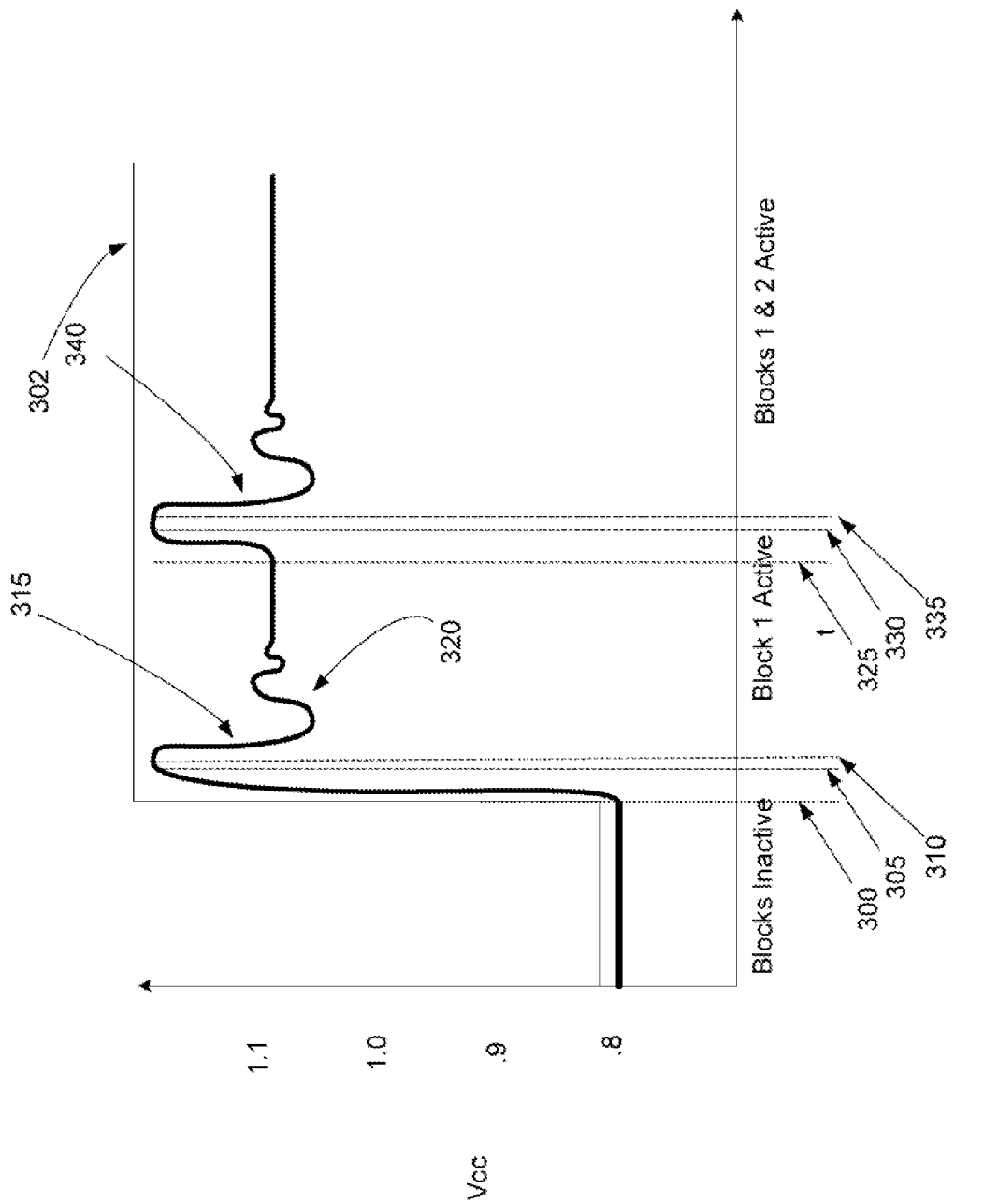
FIG. 3 is a graph showing implementation of a load line voltage in accordance with another embodiment of the present disclosure.
Figure 7:
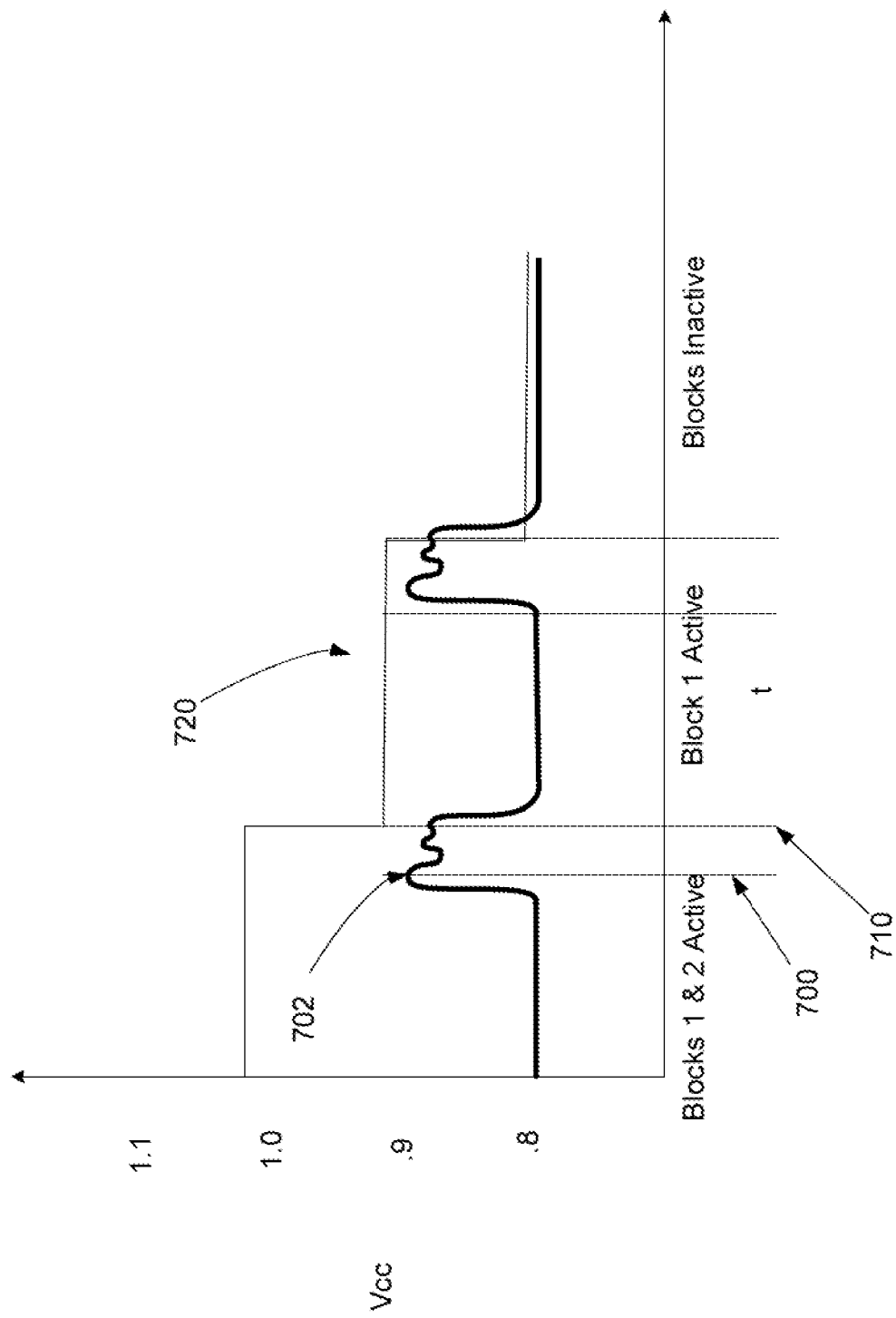
FIG. 7 is a graph showing an exemplary load line voltage using the flow chart of FIG. 6.

Having described the process, exemplary load line voltages 12 are shown in FIGS. 2, 3, and 7. FIG. 2 shows a load line that initially is supplied to processor 24 having largely inactive blocks. Point 300 reflects the time when voltage controller 23 receives an indication that activation of a block is desired. The amount of necessary or expected additional voltage is determined, either dynamically, via lookup table, or otherwise and applied by voltage regulator 22. Once the voltage increase is achieved 305, processor 24 is notified that the additional block can be activated. Activation of the additional block 310 results in voltage droop 315 and overshoot 320. While the voltage of load line 12 is shown as similar before and after activation of the additional block, equivalence is not necessary. Additionally, it should be appreciated by looking at power line 302 that activation of the additional block results in increased voltage being supplied to processor 24. Activation of a second additional block follows the same pattern of request 325, voltage increase, approval 330, block activation 335, voltage droop and overshoot 340. Again, activation of an additional block results in additional power as shown by power line 302.

FIG. 3 shows an alternative situation. Again, FIG. 3 shows a voltage that initially is supplied to processor 24 having largely inactive blocks. Point 300 reflects the time when voltage regulator 22 receives an indication that activation of a block is desired. The amount of necessary additional voltage is determined, either dynamically, via lookup table, or otherwise and applied by voltage regulator 22. Here, the block to be activated is anticipated to be able to take advantage of nearly all the processing power of processor 24. Once the voltage increase is achieved 305, processor 24 is notified that the additional block can be activated. Activation of the additional block 310 results in voltage droop 315 and overshoot 320. It should be appreciated by looking at power line 302 that activation of the additional block results in use of substantially maximum power by processor 24. Activation of a second additional block follows a somewhat different pattern. Because the first block was previously using all available power, activation of a second block requires the first block to cede some of the processing power it was utilizing. Accordingly, request 325 results in less load being applied by the first block and thus increased voltage to account for droop and overshoot. After the voltage raise is achieved, approval 330, second block activation 335, and voltage droop and overshoot 340 follow. Throughout activation of the second block, the supplied power is substantially steady shown by power line 302 and various loads are removed and applied to result in the voltage changes reflected in FIG. 3. One example of when this situation could apply is when additional PCI express lanes are being activated. In one example, when only four PCI Express lanes are active, they are able to be run in "generation 2" mode which provides additional performance relative to operating in "generation 1" mode. When more than 4 PCI Express lanes are needed, the performance of the lanes is pulled back to "generation 1" mode. Accordingly, blocks for additional lanes are activated, but the four already active lanes present a reduced load.

FIG. 7 shows an exemplary graph of processing blocks being deactivated to send the processor to an inactive state. FIG. 7 shows a load line that initially is supplied to processor 24 having active blocks. Point 700 reflects the time when a block is deactivated. Embodiments are envisioned where permission is required to deactivate a block (i.e. voltage regulator 24 must know of the impending deactivation and take appropriate action to be ready to handle the deactivation). However, embodiments are also envisioned where no permission is needed to allow deactivation. The resulting reduction in load causes a rise in the voltage and has an associated overshoot 702. Voltage regulator 22 then determines what block was deactivated, if it doesn't already know, either by being informed by another entity, or by internal calculations. The amount of voltage/power used by the now-deactivated block is determined, if it wasn't previously. The determination of the amount (or expected amount) is made either dynamically, via lookup table, or otherwise. Voltage regulator 22 then alters (in this case, reduces) the output voltage and power (point 710). Accordingly, periods of reduced use provide periods of reduced power consumption (power line 720) and voltages rather than needing to maintain constantly high levels to account for unknown potential loads. Periods of reduced use also provide reduced heat. Reduced heat from one component allows other components to utilize any heat management capacity within the system. Accordingly, other components may be able to operate with increased performance by having increased heat management resources allocated to them.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

What is claimed is:

1. A method of controlling circuit voltage comprising:
   requesting, by an electrical component, permission for an electrical component block to enter a state that requires a different current draw relative to a current state of the electrical component block;
   receiving permission to enter the requested state, the permission coming from a voltage regulator for the electrical component, wherein the voltage regulator dynamically determines whether the requested state can be supported;

transmitting a permission signal to the electrical component when the requested state can be supported; and entering, by the electrical component block, the state that requires a different current draw responsive to receiving the requested permission.

2. The method of claim 1, further including: sending an indication that the electrical component block has entered a state that requires lesser current draw relative to a previously reported state.

3. The method of claim 1, wherein the electrical component is a processor.

4. The method of claim 1, wherein requesting permission for an electrical component block to enter a state includes transmission of a message that identifies the state for which permission is sought.

5. A circuit comprising:
an electrical component operative to handle at least one processing block;
a voltage regulator controlling a voltage supplied to the at least one electrical component; each of the at least one processing block having a first state presenting a first load on the supplied voltage and having a second state presenting a second load on the supplied voltage; and
the voltage regulator operative to determine that the at least one processing block wants to switch from the second state to the first state; dynamically determine a voltage increase requirement that could be caused by the at least one processing block switching from the second state to the first state, determine whether the voltage increase requirement can be supported; and alter the voltage supplied by the voltage regulator by at least the voltage increase requirement; and issue a permission signal to the electrical component responsive to the determination of whether the voltage requirement is able to be supported.

6. The circuit of claim 5, further comprising a memory, the memory storing a plurality of instructions that when interpreted adapt the voltage regulator to alter the voltage.

7. The circuit of claim 6, wherein the memory storing a plurality of instructions that when interpreted adapt the voltage regulator to alter the voltage comprises instructions to further adapt the voltage regulator to:
determine that the at least one processing block desires to switch from the second state to the first state; and
determine a voltage increase requirement that could be caused by the at least one processing block switching from the second state to the first state.

8. The circuit of claim 6, wherein the plurality of instructions, when interpreted by voltage regulator further cause the voltage control module to:
determine that less voltage is needed by the electrical component; and
reduce the voltage supplied to the electrical component.

9. The circuit of claim 8, wherein reducing the voltage supplied to the electrical component reduces the power supplied to the electrical component.

10. The circuit of claim 5, wherein increasing the voltage supplied by the voltage control module provides increased power to the electrical component.

11. The circuit of claim 5, wherein the voltage regulator outputs a DC voltage to the electrical component.

12. The circuit of claim 5, wherein the second state produces less heat within the electrical component relative to the first state.

13. The method of claim 5, wherein the voltage regulator determines the voltage increase requirement subsequent to determining that the at least one processing block wants to switch from the second state to the first state.

14. A method of controlling circuit voltage comprising:
determining that at least one electrical component block wants to switch from a second state that draws a second current flow to a first state that draws a first current flow;
determining a voltage change requirement to provide for the at least one electrical component block switching from the second state to the first state;
dynamically determining, by a voltage regulator, if such voltage requirement is able to be provided;
altering the voltage supplied by the voltage regulator to accommodate the determined voltage change requirement, responsive to the determination that such voltage requirement is able to be provided, and
issuing a permission signal from the voltage regulator to the electrical component responsive to the determination that the voltage requirement is able to be provided.

15. The method of claim 14, wherein the electrical component block is a processing block of a computer processor.

16. The method of claim 14, further including issuing communication that authorizes the at least one electrical component block to enter the second state.

17. The method of claim 14, further including issuing a communication that indicates that the voltage supplied by the voltage regulator has been increased to accommodate the at least one electrical component block switching from the second state to the first state.

18. The method of claim 14, further including determining a first point in time when the at least one electrical component block will be in the second state, and providing for the voltage supplied by the voltage regulator to be lower at the first point in time.

19. The method of claim 14, wherein determining a voltage change requirement to provide for the at least one electrical component block switching from the second state to the first state is performed subsequent to determining that at least one electrical component block wants to switch from the second state to the first state.

20. A voltage regulator comprising:
logic to regulate a direct current (DC) output voltage thereof in accordance with a loadline to power at least one electrical component block, each electrical component block of the at least one electrical component block having a first state that draws a first current flow and having a second state that draws a second current flow, the second current flow being less than the first current flow;
the loadline being dynamically set to supply a voltage that is the sum of 1) voltage necessary to supply the coupled at least one component block in its current state and 2) an amount equal to a worst case voltage step associated with switching from the second state to the first state, further including an output that sends a message to the at least one electrical component block that indicates permission for the at least one electrical component block to switch from the second state to the first state when the switching is supported.

21. The regulator of claim 20, further including a power input electrically coupled to a power source, a data input electrically coupled to the at least one electrical component block, a data output electrically coupled to the at least one electrical component bock, and a voltage output that powers the load line.

22. The regulator of claim 20, wherein the worst case voltage step includes voltage droop and overshoot associated with switching from the second state to the first state.

* * * * *